United States Patent
Holmes et al.

(10) Patent No.: US 7,484,646 B1
(45) Date of Patent: Feb. 3, 2009

(54) DIVE MASK INDEX BRACKET

(75) Inventors: Charles Holmes, Southport, FL (US); Dennis Gallagher, Lynn Haven, FL (US); William D. Olstad, Panama City, FL (US); William W. Hughes, III, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 869 days.

(21) Appl. No.: 10/956,518

(22) Filed: Sep. 23, 2004

(51) Int. Cl.
*A42B 1/24* (2006.01)

(52) U.S. Cl. .............................. 224/181; 2/422; 362/105

(58) Field of Classification Search ................. 224/181, 224/271, 272, 930, 908, 909; 359/815, 409, 359/896; 362/105, 106; 2/209.13, 422, 6.3, 2/6.7
See application file for complete search history.

(56) References Cited

U.S. PATENT DOCUMENTS

| | | | | | |
|---|---|---|---|---|---|
| 3,971,933 | A | * | 7/1976 | Adamson, Jr. | 250/214 VT |
| 4,457,461 | A | * | 7/1984 | Docking et al. | 224/181 |
| 4,592,096 | A | * | 6/1986 | Glasheen | 2/427 |
| 4,809,942 | A | * | 3/1989 | Kastendieck et al. | 248/222.13 |
| 5,307,204 | A | * | 4/1994 | Dor | 359/400 |
| 5,331,459 | A | * | 7/1994 | Dor | 359/409 |
| 5,341,512 | A | * | 8/1994 | Noble | 2/6.2 |
| 5,469,578 | A | * | 11/1995 | Mattes | 2/6.7 |
| 5,471,678 | A | * | 12/1995 | Dor | 2/6.7 |
| 5,530,631 | A | * | 6/1996 | Smith et al. | 362/105 |
| 5,703,354 | A | * | 12/1997 | Wannagot et al. | 250/214 VT |
| 5,767,932 | A | * | 6/1998 | Gordon | 351/43 |
| 5,786,932 | A | * | 7/1998 | Pniel | 359/409 |
| 5,857,599 | A | * | 1/1999 | Palmer | 224/181 |
| 6,390,640 | B1 | * | 5/2002 | Wong et al. | 362/105 |
| 6,618,906 | B2 | * | 9/2003 | Ciesiun | 24/3.12 |
| 6,662,370 | B1 | * | 12/2003 | Buchanan, Jr. | 2/6.2 |
| 6,667,832 | B2 | * | 12/2003 | Caplan et al. | 359/409 |
| 6,912,727 | B2 | * | 7/2005 | Buchanan, Jr. | 2/6.2 |
| 6,986,162 | B2 | * | 1/2006 | Soto et al. | 2/6.3 |
| 2002/0035748 | A1 | * | 3/2002 | Racine | 2/414 |
| 2003/0115661 | A1 | * | 6/2003 | Dobbie et al. | 2/422 |
| 2005/0111097 | A1 | * | 5/2005 | Iannarelli et al. | 359/409 |

* cited by examiner

*Primary Examiner*—Nathan J Newhouse
*Assistant Examiner*—Corey N Skurdal
(74) *Attorney, Agent, or Firm*—James T. Shepherd

(57) ABSTRACT

An index bracket assembly positions an external apparatus on a facemask having top and side portions extending to lower corners. A U-shaped frame connected to the external apparatus has top and side openings and a U-shaped bearing surface having orthogonally extending feet at its opposite ends. The U-shaped bearing surface extends along the top and side portions and the feet abut against the lower corners of the facemask. A three-point harness has a top strap connected to the top opening and side straps are connected to the side openings. The top strap and side straps each have a separate adjustable buckle component connected together for tightening them and pulling the U-shaped bearing surface against the top and side portions of the facemask. A layer of compliant material on the U-shaped surface elastically yields to the top and side portions of the facemask to prevent slippage.

21 Claims, 5 Drawing Sheets

DIVE MASK INDEX BRACKET

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to an improvement for facemasks worn by divers or firefighters. More particularly, this invention is to a bracket structure mountable on the outside of a facemask to securely position or index an external apparatus that can visually assist a wearer in the performance of tasks.

Divers and other workers such as firefighters that wear facemasks frequently need to be apprised of information or other details clearly for the successful and safe completion of difficult work assignments. This can include details of the surroundings and structures or data regarding the diver's depth and facing direction, the status of the life-support breathing apparatus, and the total time of the operation under different environmental and ambient conditions. Typically, a diver is supplied with separate timers, pressure gauges and/or other displays for monitoring some critical information.

Some head-mounted displays (HMDs) that provide information have been hard-mounted to a helmet or a full-facemask but these HMDs have not been usable with a single strap scuba-type facemask. Some specialized masks have been manufactured with one type or another of display made as an integral part; but these may be costly and not suitable for other tasks or other work conditions. Consequently, displays of needed information are not made available since too many different, expensive masks would have to be kept in inventory for the different applications.

As the technology for HMDs advances, so does their use. Thus, an inventory of expensive, specialized masks can become obsolete after a relatively short time. In addition, new safety and job requirements are evolving that require divers to use HMDs while wearing certain mask types and still be able to remove the HMDs quickly to get rid of the attached systems (e.g. for safety reasons) or to pass the systems to other divers. However, removal of a facemask underwater to make this removal or transfer is unacceptably hazardous, so that further development and improvements of this technology are needed.

Thus, in accordance with this inventive concept, a need has been recognized in the state of the art for a means for securely positioning or indexing displays of information and other visual aids in the field of view of a wearer of a facemask that can be fitted onto and removed from the facemask to improve safety and operational effectiveness without unduly encumbering the mask.

OBJECTS AND SUMMARY OF THE INVENTION

An object of the invention is to provide a removable index bracket assembly for a HMD to increase the safety and operational effectiveness of a wearer of a facemask.

Another object of the invention is to provide an index bracket assembly for a wearer such as a diver to secure an external visual-aid apparatus, such as a camera, light, compass, head-mounted display, etc. to a personal mask while retaining the ability to remove the apparatus quickly without dislodging or removing the mask.

Another object is to provide an index bracket assembly for a facemask wearer to provide a stable mounting platform for external apparatuses without actually attaching the bracket and apparatus to the facemask.

Another object is to provide an index bracket assembly allowing a facemask wearer to safely put on and remove (don & doff) an external visual-aid apparatus such as a head-mounted display, light, sonar, compass, camera, etc., without removing the facemask.

Another object is to provide an index bracket assembly for a facemask permitting its safe, one-handed, quick removal.

Another object is to provide an index bracket assembly for a facemask that remains stable and indexed to the mask without being rigidly or permanently attached to it.

Another object is to provide an index bracket assembly attached to an external underwater apparatus and including a quickly removable three-point head-strap holding it on a facemask.

Another object is to provide an index bracket assembly allowing precise visual alignment with external apparatuses such as cameras, head-mounted displays, sonars, etc., without attaching anything to a facemask and without compromising a wearer's safety.

Another object is to provide an index bracket assembly capable of supporting visual aid apparatuses in the field of view and being fitted onto standard scuba masks, or full-facemasks including masks used for other than diving, such as firefighting, and masks used to safeguard their wearers from ambient chemical/biological agents.

These and other objects of the invention will become more readily apparent from the ensuing specification when taken in conjunction with the appended claims.

Accordingly, the present invention is to an index bracket assembly that securely positions an external apparatus on a facemask having top and side portions extending to lower corners. A U-shaped frame connected to the external apparatus has top and side openings and a U-shaped bearing surface has one of a pair of orthogonally extending feet at its opposite ends. The U-shaped bearing surface contiguously extends along the top and side portions of the facemask and the feet abut against the lower corners. A three-point harness has a top strap connected to the top opening and side straps are connected to the side openings. The top strap and side straps each have a separate adjustable buckle component connected together for tightening them and pulling the U-shaped bearing surface against the top and side portions of the facemask. The adjustable buckle components secure the top and side straps after tightening. A layer of compliant material on the U-shaped surface elastically yields to the top and side portions of the facemask to prevent slippage. A push-button release mechanism interconnects the adjustable buckle components of the top and side straps to allow quick, one handed disengagement of the index bracket assembly and the external apparatus from the facemask. The top and side straps of the three point harness are flexible and inelastic, and the feet have flat surfaces to abut against the lower corners of said facemask to prevent shifting of the external apparatus. Optionally, threaded holes could be included at opposite ends of U-shaped bearing surface in the U-shaped frame and the feet could be orthogonally extending threaded pegs selectively tightened into different ones of the threaded holes for accommodating lower corners of different facemasks. A clevis mechanism interconnects the U-shaped frame and the external apparatus. The clevis mechanism has first and second leg members coupled to the U-shaped frame, a cylindrical member coupled to the external apparatus, and a pin. The first leg member is provided with a traverse bore, the second leg member has a threaded bore, the cylindrical member has an axial bore and is interposed between the leg members, and the pin has a threaded end portion extending through the traverse and axial bores and engaging the threaded bore. Washers mounted on inside surfaces of the leg members and to opposite ends of the cylindrical member withstand frictional wear during rotary motion of the leg and cylindrical members. Selectively tightening the pin creates frictional engagement for positioning and holding the external apparatus adjacent on the U-shaped frame and above the U-shaped frame out of a field of view of a wearer of the facemask.

DESCRIPTION OF THE PREFERRED EMBODIMENTS

Figure 1:
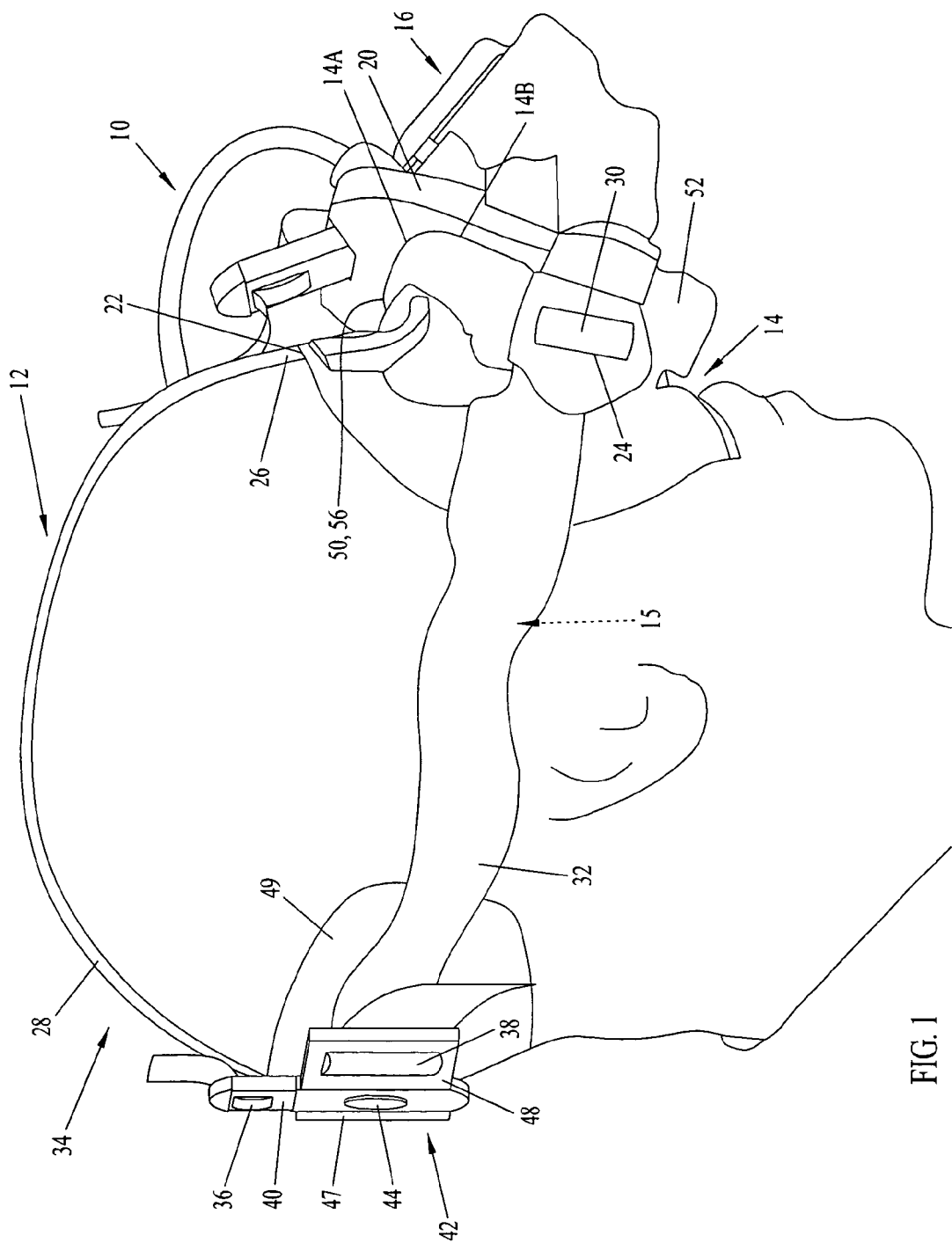
FIG. 1 is a schematic side view of the index bracket assembly of the invention securely supporting an external visual aid apparatus on a facemask in a wearer's field of view.
Figure 2:
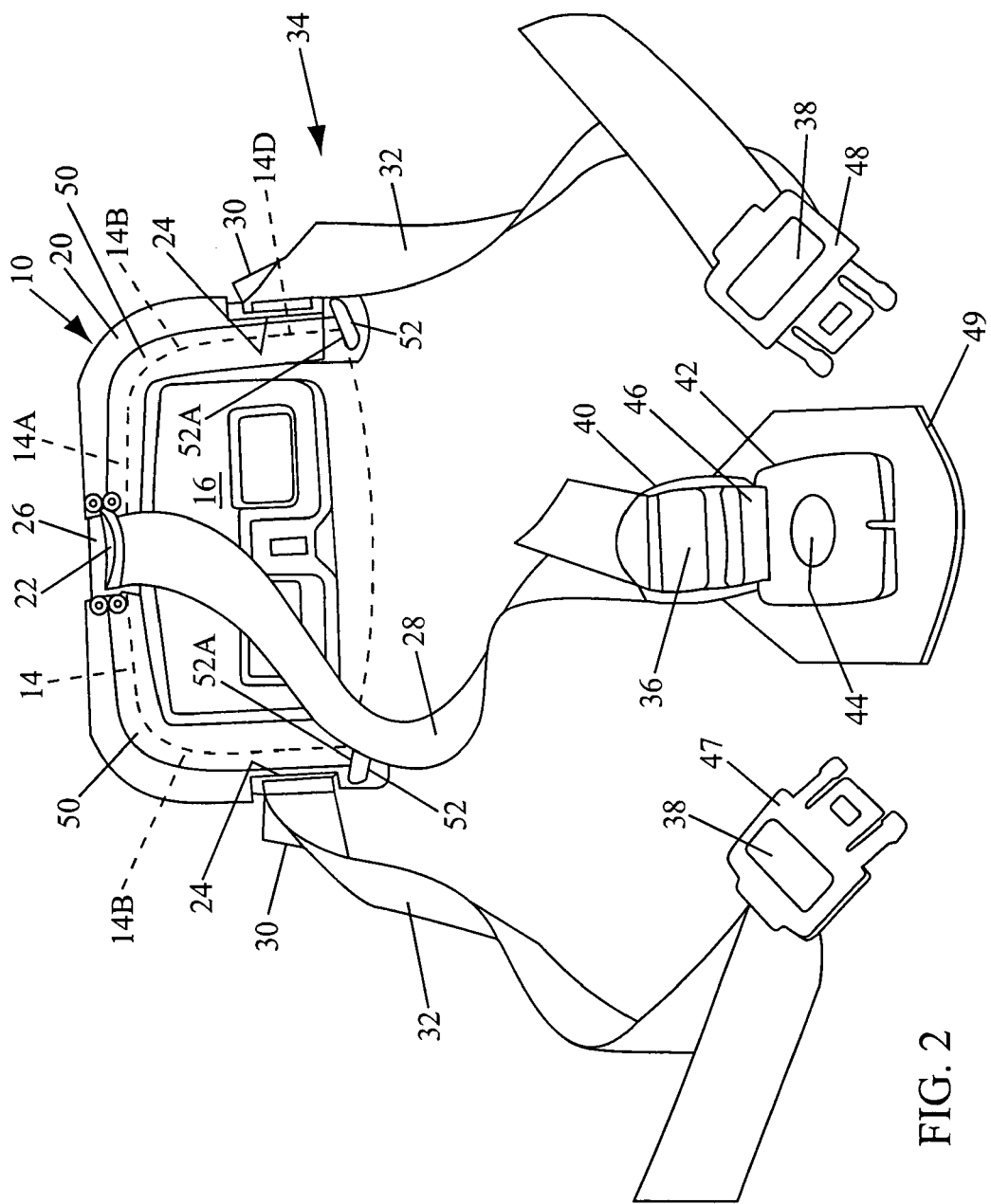
FIG. 2 is a rear view of the index bracket assembly having straps of the three-point harness unconnected and an external apparatus positioned in the front field of view of a facemask outlined in phantom.

Referring to FIGS. 1 and 2, index bracket assembly 10 of the invention is designed to securely fit around the head 12 and a facemask 14 worn by those involved in the performance of high-risk, demanding tasks, such as divers, fire-fighters, hazardous materials workers, and disaster-recovery teams. Index bracket assembly 10 holds and selectively, securely positions an external apparatus 16 that provides environmental or task related data or permits the observation or taking of ambient data; external apparatus 16 might be a camera, light source, compass, depth sensor/readout, bottom-time accumulation monitor, head-mounted display, etc. on a personal facemask 14. Each external apparatus 16 can be sealed from the submerged or in-air environment to reliably provide or gather data. Different external apparatuses 16 can be chosen for different tasks and each can be mounted on index bracket assembly 10 which can selectively position each apparatus 16 in at least part of the forward field of view of facemask 14. A worker can grasp and appropriately rotate external apparatus 16 for viewing during a portion or all of the time during performance of a job. Thus, index bracket assembly 10 of the invention serves as an index that can indicate to a wearer a value or quantity presented by a given apparatus 16 that can help a wearer arrive at a particular fact or conclusion.

Index bracket assembly 10 has an essentially U-shaped frame 20 having a top slotted opening 22 and side slotted openings 24 respectively receiving a top end loop 26 of a top strap or webbing 28 and side end loops 30 of side straps or webbing 32 of a three-point harness 34. In accordance with this invention substantially inelastic, flexible straps 28 and 32 made from a material such as one inch nylon having a fine weave for smooth adjusting are preferable. Other flexible natural or synthetic inelastic compounds for straps 28 and 32 could be used as well and are preferable to elastic materials since they more securely position U-shaped frame 20 on facemask 14. Side straps 32 are located to coextend with side straps 15 that are connected to opposite sides of facemask 14. This arrangement of straps 15 and 32 restricts twisting of facemask 14 when side straps 32 are tightened so that the water or air tight integrity of facemask 14 is not compromised as index bracket assembly 10 is securely fitted on facemask 14.

The opposite ends of top strap 28 and side straps 32 have looped back ends 36 and 38. Looped back end 36 of top strap 28 is looped through an adjustable buckle component 40. A suitable commercially available adjustable buckle such as one of the designs marketed as the Ladderloc series of adjustable buckles by ITW Nexus U.S., 195 Algonquin Road, Des Plaines, Ill. 60016-6197, could be used for adjustable buckle component 40. Adjustable buckle component 40 allows quick, one-handed release or tightening of strap 28 so that different lengths of top strap 28 can be engaged by adjustable buckle component 40 to accommodate differently sized heads and other protective garments (not shown) on head 12 and assure firm and secure fitting of U-shaped bearing surface 50 on and against facemask 14. Harness 34 has a center release buckle 42 provided with a center release push-button section 44 that interconnects straps 28 and 32 at the back of head 12. Adjustable buckle component 40 is connected to center release buckle 42 by a loop of webbing 46. A suitable commercially available center release buckle such as the specialty buckle known as Center Release Sliploc also marketed by ITW Nexus U.S. could be used for center release buckle 42. Center release buckle 42 receives looped back ends 38 of side straps 32 through releasable and adjustable buckle connector components 47 and 48 that allow quick, one-handed release or tightening of straps 32 so that straps 32 can accommodate differently sized heads and other protective garments and allow firm and secure fitting of U-shaped frame 20 on and against facemask 14. A thin layer of neoprene 49, about 0.25 inches thick could be under buckle component 40 and buckle 42 for comfort.

Pushing in on push button 44 assures an immediate, one-handed release of the straps of harness 34 and the rest of index bracket assembly 10 and external apparatus 16 from a wearer. This quick release capability is highly desirable to avoid possible entanglement at a work site, for example, or to transfer index bracket 10 and apparatus 16 to another diver or workman. Thus, center release buckle 42 allows removal of apparatus 16 quickly without the hazards associated with other mask displays that require dislodging or removing mask 14.

Figure 3:
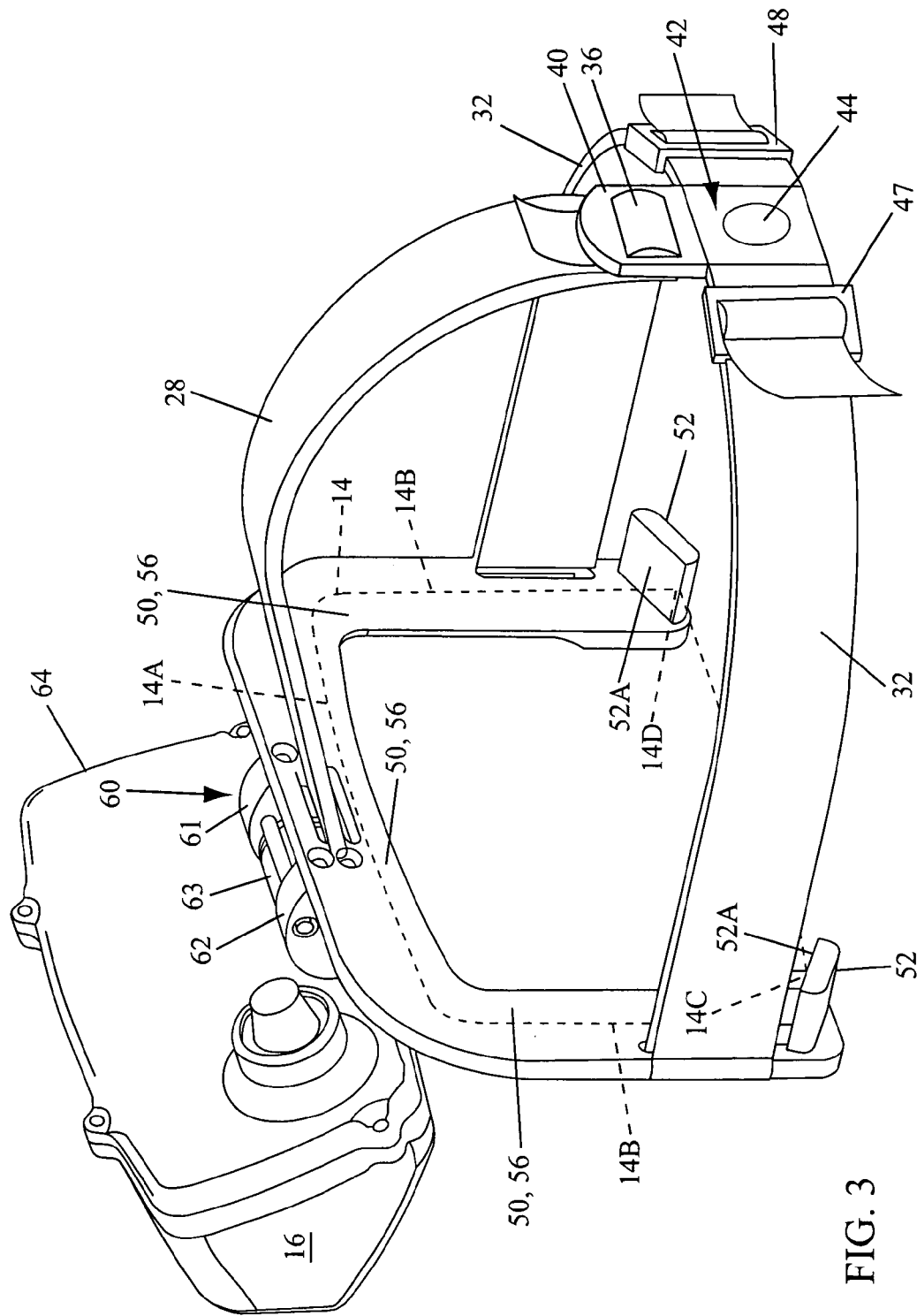
FIG. 3 shows the index bracket assembly having straps of its three-point harness coupled together, the external assembly rotated to a position above the front of a facemask outlined in phantom.

Referring also to FIG. 3, U-shaped frame 20 of index bracket assembly 10 has a flat U-shaped bearing surface 50 sized to contiguously fit against a forwardly facing top rim portion 14A and side rim portions 14B of facemask 14. In this and other figures facemask 14, top rim portion 14A, side rim portions 14B, lower opposite corners 14C and 14D, and the lower part of facemask 14 extending between lower opposite corners 14C and 14D are shown as dashed lines in phantom. U-shaped bearing surface 50 continuously extends between feet 52 on frame 20, and feet 52 orthogonally jut from frame 20 at the opposite ends of U-shaped surface 50. U-shaped frame 20 and feet 52 can be fabricated from strong, lightweight and preferably non-corrosive or corrosion resistant materials such as stereo lithography-resin, RTV cast urethane, and machined aluminum, as well as a number of other materials.

Feet 52 can be integral orthogonal projections of U-shaped frame 20 that have surfaces 52A that abut against lower opposite corners 14C and 14D of one design of facemask 14 having set dimensions for rim portions 14A and 14B. Feet 52 locate rim portions 14A and 14B on U-shaped bearing surface 50 and securely position apparatus 16 in the forward field of view. Feet 52 bear the weight of at least a part of index bracket assembly 10 and external apparatus 16 and keep index bracket assembly 10 and external apparatus 16 from sliding or shifting upward or downward. Such sliding or shifting might otherwise happen when U-shaped frame 20 and/or external apparatus 16 is inadvertently bumped during work activities. Sliding or shifting is also prevented from occurring when top and side straps 28 and 32 are tensioned or pulled-on and secured in buckle components 40, 47, and 48.

Figure 4:
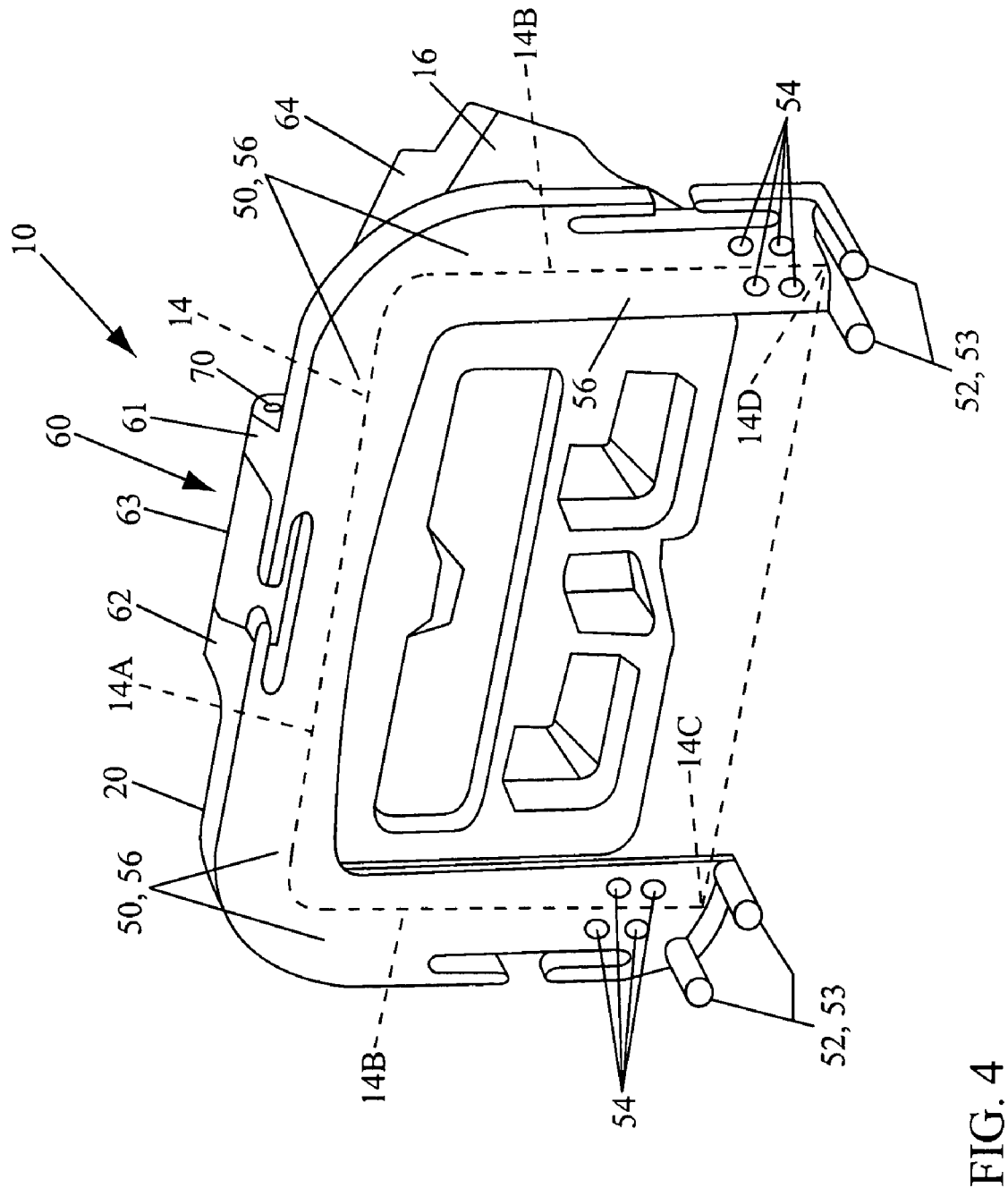
FIG. 4 shows the clevis mechanism interconnecting the external apparatus to the U-shaped frame and threaded pegs and threaded holes at opposite ends of the U-shaped surface on the U-shaped frame for abutting lower corners of differently sized facemasks, one of which being outlined in phantom.

Referring also to FIG. 4, feet 52 optionally can be shaped as one or more orthogonally extending threaded pegs 53, see FIG. 4. Pegs 53 can be at opposite end portions of U-shaped bearing surface 50 of U-shaped frame 20 and tightened into different correspondingly spaced-apart threaded holes 54. Pegs 53 can be screwed into different threaded holes 54 to abut against lower corners 14C and 14D of differently shaped facemasks 14. The abutting engagement of corners 14C and 14D by pegs 53 of feet 52 locates portions 14A and 14B on U-shaped bearing surface 50, prevents sliding or shifting of external apparatus 16 and securely positions it in the forward field of view. U-shaped frame 20 has a resilient, compliant non-slip surface layer 56 coated or otherwise adhered, secured or laminated to bearing surface 50. Non-slip surface layer 56 can be rubber or other resilient, compliant material, preferably of about 0.060 inches thickness, on U-shaped bearing surface 50 that yields elastically to compliantly conform to the shape of top rim portion 14A, side rim portions 14B and parts of lower corners 14C and 14D of facemask 14 when these portions are pressed into it. Layer 56 creates a non-slip surface interface between facemask 14 and index bracket assembly 10 that helps keep index bracket assembly 10 from sliding in any direction. In other words, as straps 28 and 32 are adjusted to pull and hold U-shaped bearing surface 50 of U-shaped frame 20 on and against facemask 14, layer 56 is compliantly compressed to help prevent slippage between U-shaped frame 20 of index bracket assembly 10 and facemask 14.

Figure 5:
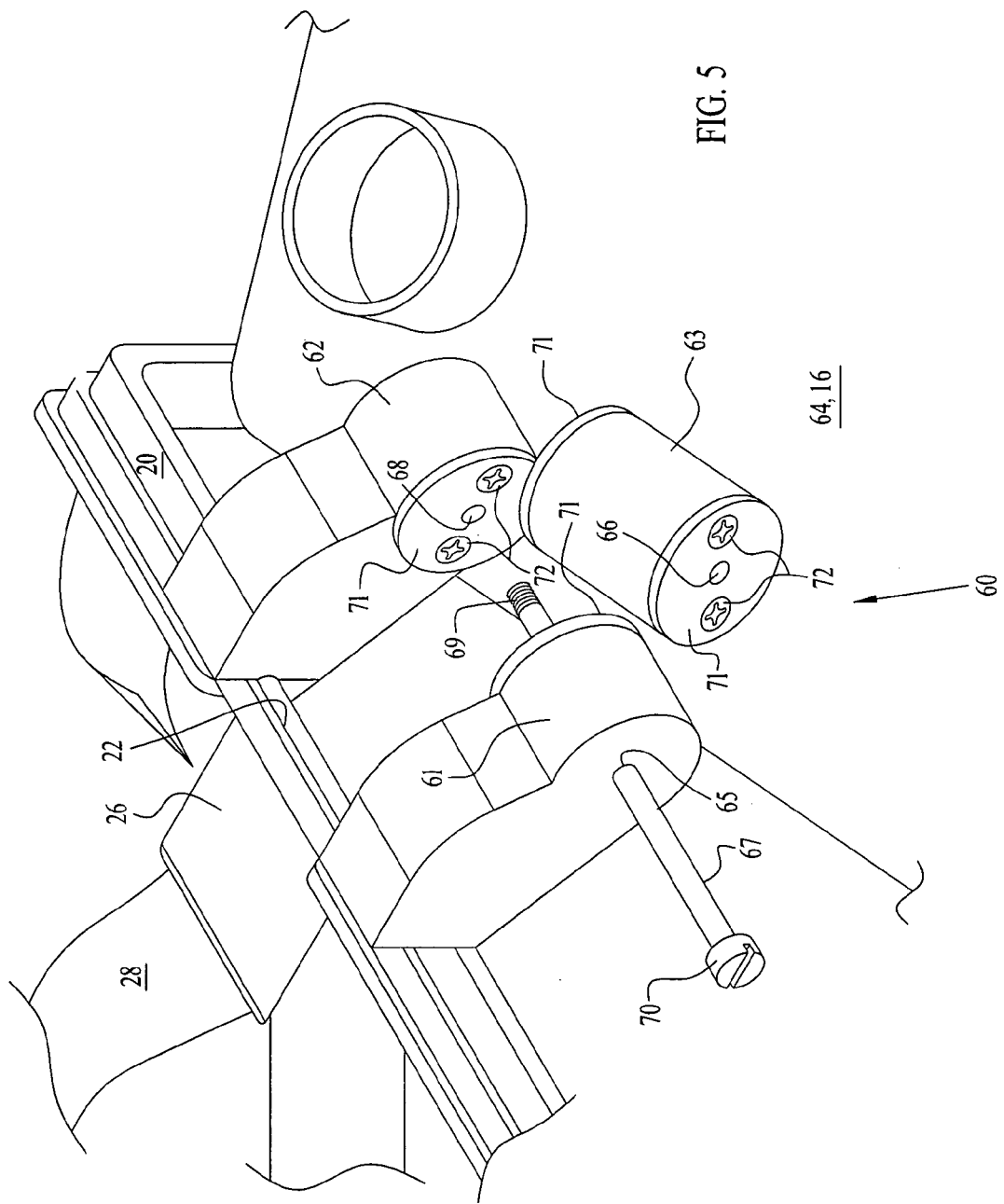
FIG. 5 shows details of the clevis mechanism.

Referring also to FIG. 5, a clevis mechanism 60 is mounted at the top of U-shaped frame 20 and has a pair of outwardly extending substantially parallel leg members 61 and 62, and a cylindrical member 63 interposed between members 61 and 62. Cylindrical member 63 can be directly connected to external apparatus 16 or can be connected to a mounting structure 64 secured to apparatus 16. Leg member 61 has a traverse bore 65 aligned with an axial bore 66 of cylindrical member 63 to slideably receive an elongate pin 67 through them. Leg member 62 has a threaded bore 68, and pin 67 has a threaded end portion 69 sized to engage threaded bore 68 when pin 67 is inserted in it and tightened by rotating its opposite end portion 70 with a screwdriver or wrench (not shown). When pin 67 is tightened via end portion 70, threaded end portion 69 engages threaded bore 68 and leg members 61 and 62 are drawn together to exert a compressive force on cylindrical member 63.

Replaceable stainless steel washers 71 are mounted by screws 72 or otherwise secured on the insides of leg members 61 and 62 and to opposite ends of cylindrical member 63. Washers 71 abut and rub against one other when pin 67 is tightened to create the compressive force that causes an adjustable purely frictional engagement between leg members 61 and 62 and cylindrical member 63. This frictional engagement can hold and position external apparatus 16 adjacent and on U-shaped frame 20 or above it out of the field of view. A wearer of index bracket assembly 10 can overcome this frictional engagement by merely grasping external apparatus 16 and exerting sufficient rotational force to overcome the frictional drag and rotate external apparatus 16 up and out of the frontal field of view for unobstructed viewing, or rotate external apparatus 16 down into the field of view when the information of external apparatus 16 is needed. The amount of frictional compressive force that is needed to be exerted by clevis mechanism 60 to hold external apparatus 16 above or in the frontal field of view can be adjusted before or during work activity and can take into account different sizes and weights of apparatuses 16 and conditions at a work site. Stainless steel washers 71 withstand the frictional and abrasive wear expected during repeated rotary motions of leg members 61 and 62 and cylindrical member 63 instead of the members themselves.

In addition, clevis mechanism 60 permits quick replacement of one external apparatus 16 with another external apparatus 16 that has better information for a particular task. Pin 67 is unscrewed and removed and the first apparatus 16 is removed. Then, a second external apparatus 16 is selected from inventory and installed by retightening pin 67 quickly at or near the work site, and no special tools are needed.

Index bracket assembly 10 of the invention provides a capability to view various essential head mounted display systems needed for a task at hand. Index bracket assembly 10 of the invention incorporates the synergistic advantages of an inelastic, flexible three point harness 34, U-shaped frame 20, feet 52 or pegs 53, and non-slip surface layer 56 on U-shaped surface 50 to remove and interchange observable information from different external apparatuses 16 without removing facemask 14.

Having the teachings of this invention in mind, modifications and alternate embodiments of index bracket assembly 10 may be adapted without departing from the scope of the invention. Index bracket assembly 10 could hold and position a variety of information sources in different external apparatuses 16 for a wearer of facemask 14 to enhance performance of a task without adding unacceptable bulk. The hazards associated with performance of some tasks are diminished since external apparatuses 16 can be easily and quickly removed or transferred without removing facemask 14.

The disclosed components and their arrangements as disclosed herein, all contribute to the novel features of this invention. Index bracket assembly 10 of the invention provides a means to give wearers of single-strap facemasks an option for selectively viewing information that can help in the performance of a task. Different external apparatuses 16 can be connected to index bracket assembly 10 for different tasks and the requirement for an inventory of different facemask structures is eliminated. Therefore, index bracket assembly 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

We claim:

1. An index bracket assembly for positioning an external apparatus on a facemask having coplanar top rim portion and side rim portions extending to lower corners comprising:

a U-shaped frame connected to said external apparatus and having a top opening, side openings and a coplanar flat U-shaped bearing surface, said coplanar flat U-shaped bearing surface being in a coplanar extension along said coplanar top rim portion and side rim portions of said facemask and having one of a pair of orthogonally extending feet at opposite ends thereof, said feet abutting against said lower corners of said facemask;

a three-point harness having a top strap connected to said top opening and side straps each connected to a separate one of said side openings, said top strap and said side straps being flexible and inelastic and each having an adjustable buckle component for tightening said top and side straps and pulling said coplanar flat U-shaped bearing surface against said coplanar top rim and side rim portions of said facemask, said coplanar flat U-shaped bearing surface of said U-shaped frame contiguously and continuously fitting against said coplanar top rim and side rim portions of said facemask; and a layer of compliant material on said coplanar flat U-shaped surface for elastically yielding to compliantly conform to said coplanar top rim portion and side rim portions of said facemask.

2. The assembly of claim 1 further comprising:
a push-button release mechanism interconnecting said adjustable buckle components of said top and side straps.

3. The assembly of claim 2 wherein said push-button release mechanism allows quick, one handed disengagement of said index bracket assembly and said external apparatus from said facemask.

4. The assembly of claim 1 wherein each of said feet have surfaces to abut against lower corners of said facemask to prevent sliding of said external apparatus.

5. The assembly of claim 1 further comprising:
a plurality of threaded holes at opposite ends of said coplanar flat U-shaped bearing surface in said U-shaped frame, said feet being orthogonally extending threaded pegs selectively tightened into different ones of said threaded holes for accommodating lower corners of different facemasks.

6. The assembly of claim 3 wherein said adjustable buckle components secure said top and side straps after tightening.

7. The assembly of claim 6 further comprising:
a clevis mechanism interconnecting said U-shaped frame and said external apparatus, said clevis mechanism having first and second leg members coupled to said U-shaped frame, a cylindrical member coupled to said external apparatus, and a pin coupling said cylindrical member to said first and second leg members.

8. The assembly of claim 7 wherein said first leg member is provided with a traverse bore, said second leg member has a threaded bore, said cylindrical member has an axial bore and is interposed between said leg members, and said pin has a threaded end portion extending through said traverse and axial bores and engaging said threaded bore.

9. The assembly of claim 8 further comprising:
washers mounted on inside surfaces of said leg members and to opposite ends of said cylindrical member for withstanding frictional wear during rotary motion of said leg members and said cylindrical member.

10. The assembly of claim 9 wherein tightening said threaded end portion of said pin in said engaged threaded bore draws said leg members closer together to exert a compressive force on said washers and said cylindrical member.

11. The assembly of claim 10 wherein selectively tightening said pin creates said compressive force and frictional engagement for positioning and holding said external apparatus on said U-shaped frame and above said U-shaped frame out of a field of view of a wearer of said facemask.

12. The assembly of claim 11 wherein said frictional engagement is overcome by grasping and rotating said external apparatus to overcome frictional drag to selectively rotate said external apparatus.

13. A method of securely positioning an external apparatus on a facemask having coplanar top rim portion and side rim portions extending to lower corners comprising the steps of:
connecting a U-shaped frame of an index bracket assembly to said external apparatus, said U-shaped frame having a top opening, side openings and a coplanar flat U-shaped bearing surface having one of a pair of orthogonally extending feet at opposite ends thereof;

placing a layer of compliant material on said coplanar flat U-shaped bearing surface;

placing said coplanar flat U-shaped bearing surface contiguously and continuously on said coplanar top rim portion and said side rim portions of said facemask, said coplanar flat U-shaped bearing surface extending along said coplanar top rim portion and side rim portions of said facemask;

abutting said lower corners of said facemask against said feet;

tightening top and side straps of a three point harness connected to said top opening and said side openings, said top strap and said side straps each having an adjustable buckle component for assuring tightening of said top and side straps; and using said top and side straps to pull said coplanar flat U-shaped bearing surface and said compliant layer against said coplanar top rim and side rim portions of said facemask and thereby prevent shifting of said apparatus on said facemask.

14. The method of claim 13 further comprising the step of:
interconnecting a push-button release mechanism to said adjustable buckle components of said top and side straps to permit quick, one handed disengagement of said index bracket assembly and said external apparatus from said facemask.

15. The method of claim 14 further comprising the step of:
interconnecting a clevis mechanism to said U-shaped frame and said external apparatus, said clevis mechanism having first and second leg members coupled to said U-shaped frame, a cylindrical member coupled to said external apparatus, and a pin, said first leg member being provided with a traverse bore, said second leg member having a threaded bore, said cylindrical member having an axial bore and being interposed between said leg members, and said pin having a threaded end portion extending through said traverse and axial bores and engaging said threaded bore.

16. The method of claim 15 further comprising the step of:
mounting washers on inside surfaces of said leg members and to opposite ends of said cylindrical member to allow frictional contact between said washers during rotary motion of said leg members and said cylindrical member.

17. The method of claim 16 further comprising the step of:
tightening said threaded end portion of said pin in said engaged threaded bore, thereby drawing said leg members closer together to exert a compressive force on said washers and said cylindrical member.

18. The method of claim 17 wherein said step of tightening includes the step of:

selectively holding said external apparatus on said U-shaped frame and above said U-shaped frame out of a field of view of a wearer of said facemask.

19. An assembly for mounting an apparatus externally on a facemask having coplanar top rim and side rim portions extending to lower corners comprising:
- a U-shaped frame connected to said apparatus, said U-shaped frame having a top opening, side openings, and a coplanar flat U-shaped bearing surface contiguously and continuously extending along said coplanar top rim and side rim portions of said facemask;
- means for abutting one of a pair of feet against said lower corners of said facemask, each of said feet orthogonally extending from opposite ends of said coplanar flat U-shaped bearing surface;
- harness means connected to said U-shaped frame, said harness means having flexible and inelastic straps connected to said top opening and said side openings;
- adjustable buckle means for securing said straps pulling said coplanar flat U-shaped bearing surface contiguously and continuously against said coplanar top rim and side rim portions of said facemask; and
- elastically yielding means disposed on said coplanar flat U-shaped bearing surface for elastically yielding to said coplanar top rim portion and said side rim portions of said facemask.

20. The assembly of claim 19 further comprising:
- a push-button release mechanism coupled to said adjustable buckle means allowing one handed disengagement of said assembly and said external apparatus from said facemask.

21. The assembly of claim 20 further comprising:
- clevis interconnection means rotatably coupled to said U-shaped frame and said apparatus.

* * * * *